United States Patent
Lin et al.

(10) Patent No.: US 12,128,352 B2
(45) Date of Patent: Oct. 29, 2024

(54) WATER REPLENISHMENT DEVICE

(71) Applicant: COOLER MASTER CO., LTD., Taipei (TW)

(72) Inventors: Chien-Liang Lin, Taipei (TW); Shui-Fa Tsai, Taipei (TW)

(73) Assignee: COOLER MASTER CO., LTD., Taipei (TW)

( * ) Notice: Subject to any disclaimer, the term of this patent is extended or adjusted under 35 U.S.C. 154(b) by 238 days.

(21) Appl. No.: 17/730,718

(22) Filed: Apr. 27, 2022

(65) Prior Publication Data

US 2023/0285892 A1    Sep. 14, 2023

(30) Foreign Application Priority Data

Mar. 9, 2022   (TW) ................................. 111202342

(51) Int. Cl.
*B01D 53/26* (2006.01)
*F25B 21/02* (2006.01)
*F28F 23/00* (2006.01)

(52) U.S. Cl.
CPC ........... *B01D 53/265* (2013.01); *F25B 21/02* (2013.01); *F28F 23/00* (2013.01); *F25B 2321/0251* (2013.01)

(58) Field of Classification Search
CPC ............. Y02A 20/00; F28D 2021/0038; F28D 2021/0028; F25B 2321/0251; F25B 21/02; F28F 23/00; B01D 53/265
See application file for complete search history.

(56) References Cited

U.S. PATENT DOCUMENTS

2006/0288709 A1* 12/2006 Reidy .................. B01D 5/0042
                                                  62/3.4

FOREIGN PATENT DOCUMENTS

| KR | 2019069055 A | * | 6/2019 | ............... E03B 3/28 |
| KR | 20190069055 A | * | 6/2019 | |

* cited by examiner

*Primary Examiner* — Ana M Vazquez
(74) *Attorney, Agent, or Firm* — Maschoff Brennan

(57) ABSTRACT

A water replenishment device includes a water generator and a container. The water generator includes a seat body, a heat exchanger, and a thermoelectric cooler. The seat body has a fluid channel and a catchment hole. The catchment hole is in fluid communication with the fluid channel, and the fluid channel is configured for an environment airflow to pass therethrough. The heat exchanger is partially located in the fluid channel. The thermoelectric cooler has a cold surface and a hot surface. The cold surface of the thermoelectric cooler is thermally coupled to the heat exchanger. The container has a storage space. The storage space is in fluid communication with the fluid channel via the catchment hole. The thermoelectric cooler is configured to condense the environment airflow to a liquid, and the liquid is configured to be stored in the storage space via the catchment hole.

4 Claims, 5 Drawing Sheets

WATER REPLENISHMENT DEVICE

CROSS-REFERENCE TO RELATED APPLICATIONS

This non-provisional application claims priority under 35 U.S.C. § 119(a) on Patent Application No(s). 111202342 filed in Taiwan, R.O.C. on Mar. 9, 2022, the entire contents of which are hereby incorporated by reference.

TECHNICAL FIELD

The disclosure relates to a water replenishment device, more particularly to a water replenishment device that can timely perform the replenishment of the water.

BACKGROUND

In general, a computer has a casing, a power supply, a motherboard, a central processing unit, a graphics card, and an expansion card. The power supply and the motherboard are mounted in the casing, and the central processing unit, the graphics card, and the expansion card are mounted on the motherboard. When the computer is in operation, the central processing unit performs data computation, and the graphics card processes an image, and both of them may produce a large amount of heat. Therefore, the computer manufacturer may add a fan or a liquid cooling device to dissipate heat generated from the central processing unit or the graphics card.

Regarding to the liquid cooling device, the liquid cooling device generally includes a water block, a heat exchanger, and a pump. The water block is in thermal contact with the central processing unit or the graphics card. The heat exchanger is used to dissipate heat. The water block, the heat exchanger, and the pump are connected to one another so as to form a circulation loop. There is a coolant in the circulation loop. The pump drives the coolant to flow through the water block and the heat exchanger to complete a cooling cycle. When the coolant is in the cooling cycle, the coolant transfers heat generated from the central processing unit or the graphics card to the heat exchanger to dissipate heat. In order to ensure a sufficient amount of the coolant in the circulation loop, a water replenishment device may be connected to the pump so as to use spare coolant in the water replenishment device to compensate the loss of the coolant in the circulation loop.

However, when the spare coolant in the water replenishment device is insufficient, and is not timely to be replenished by a maintainer, the coolant in the circulation loop may be insufficient, which may adversely affect the heat dissipation efficiency of the liquid cooling device.

SUMMARY

The disclosure provides a water replenishment device which is capable of timely and constantly performing the replenishment of the water without manually replenishing the coolant in the water replenishment device timely.

One embodiment of the disclosure provides a water replenishment device. The water replenishment device includes a water generator and a container. The water generator includes a seat body, a heat exchanger, and a thermoelectric cooler. The seat body has a fluid channel and a catchment hole. The catchment hole is in fluid communication with the fluid channel, and the fluid channel is configured for an environment airflow to pass therethrough. The heat exchanger is partially located in the fluid channel. The thermoelectric cooler has a cold surface and a hot surface. The cold surface of the thermoelectric cooler is thermally coupled to the heat exchanger. The container has a storage space. The storage space is in fluid communication with the fluid channel via the catchment hole. The thermoelectric cooler is configured to condense the environment airflow to a liquid, and the liquid is configured to be stored in the storage space via the catchment hole.

According to the water replenishment device as discussed in the above embodiment, the thermoelectric cooler and the heat exchanger are provided in the water replenishment device, such that the water replenishment device can condense moisture in the environment airflow to liquid. Therefore, the water replenishment device can timely and constantly perform the replenishment of the water.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
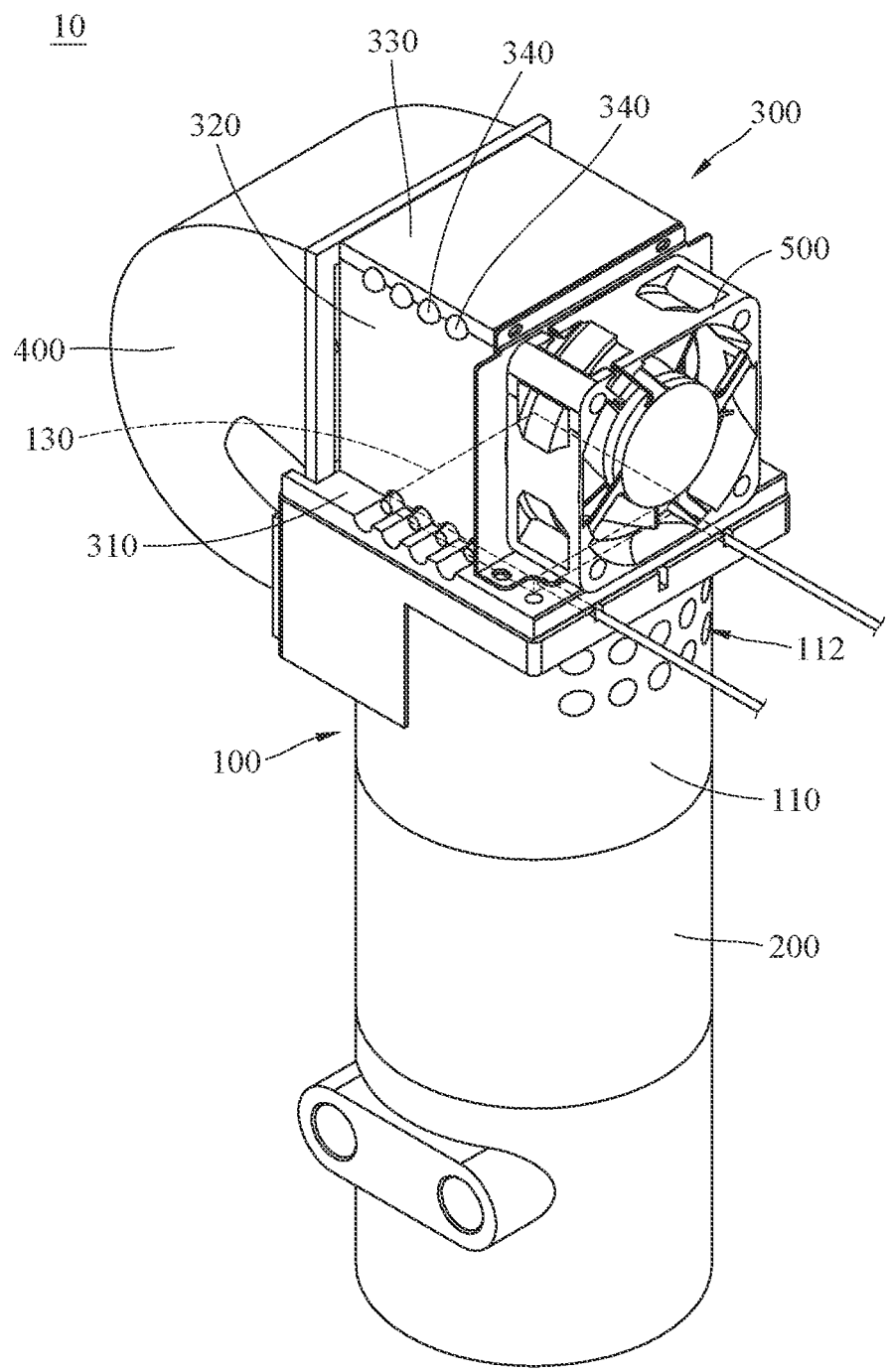
FIG. 1 is a perspective view of a water replenishment device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
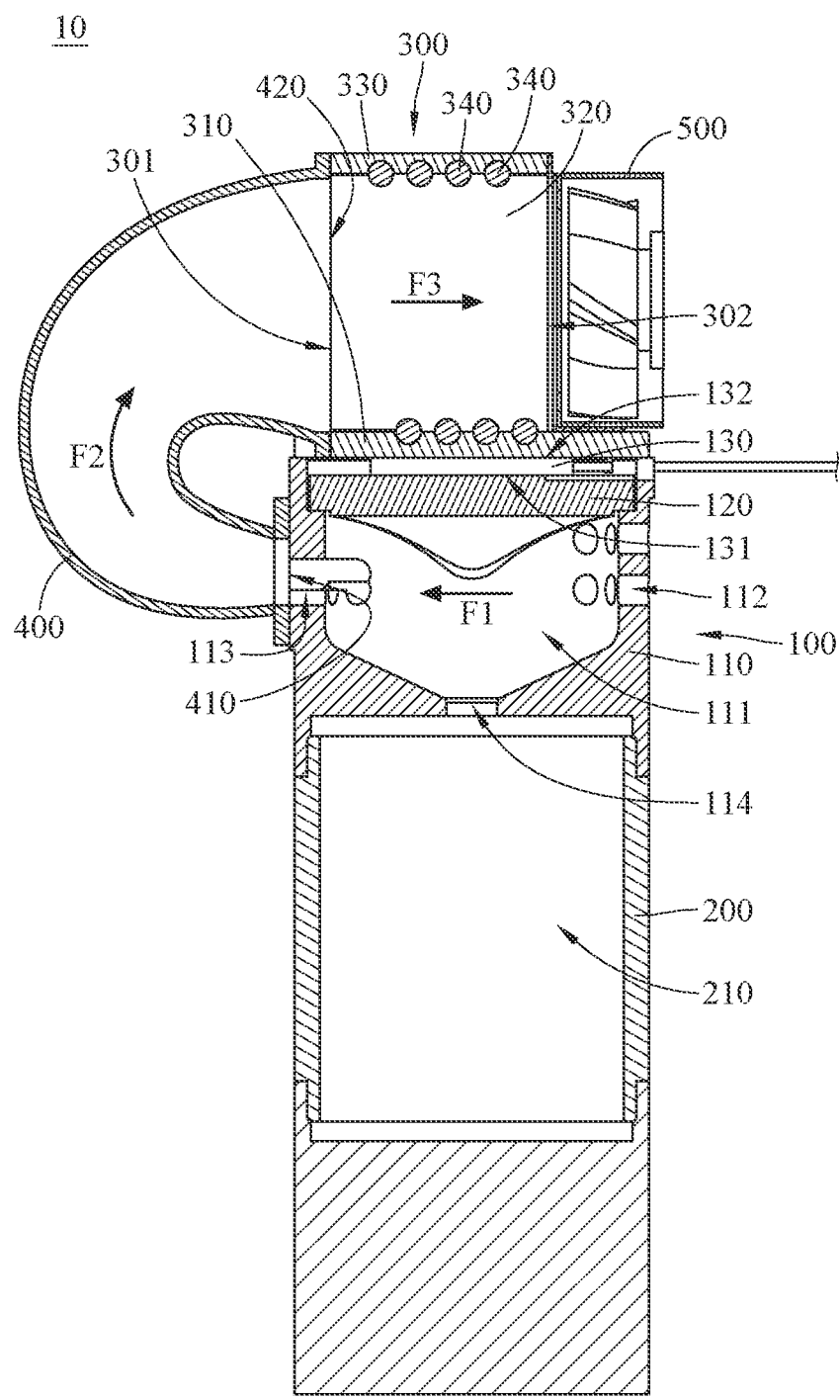
FIG. 2 is a cross-sectional view of the water replenishment device in FIG. 1.
Figure 3:
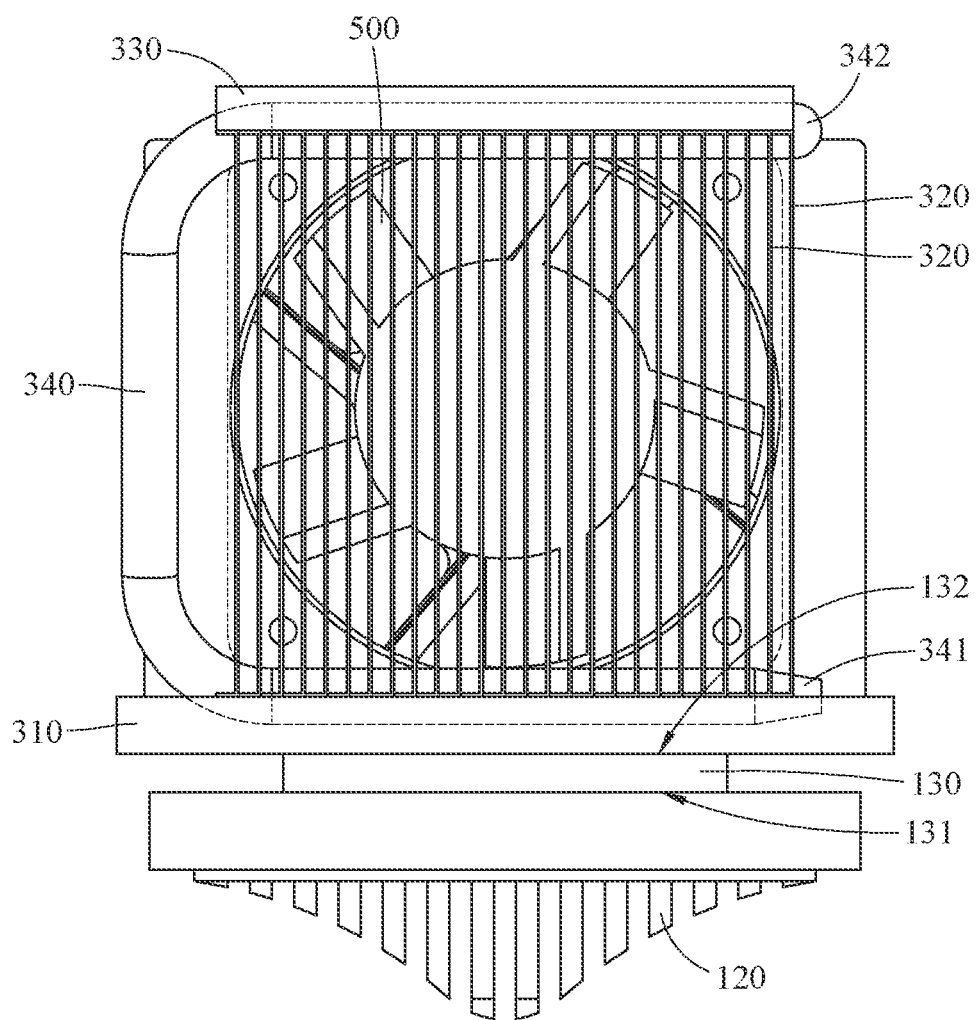
FIG. 3 is a partial perspective view of the water replenishment device in FIG. 1.

Refer to FIGS. 1 to 3, where FIG. 1 is a perspective view of a water replenishment device 10 according to a first embodiment of the disclosure, FIG. 2 is a cross-sectional view of the water replenishment device 10 in FIG. 1, and FIG. 3 is a partial perspective view of the water replenishment device 10 in FIG. 1.

In this embodiment, the water replenishment device 10 is, for example, configured to replenish water or coolant into a pump (not shown) for ensuring sufficient amount of the water or coolant in a circulation loop comprising the pump. The water replenishment device 10 includes a water generator 100 and a container 200. The water generator 100 includes a seat body 110, a heat exchanger 120, and a thermoelectric cooler 130. The seat body 110 has a fluid channel 111, an air inlet 112, an air outlet 113, and a catchment hole 114. The fluid channel 111 is configured for an environment airflow to pass therethrough. The air inlet 112 and the air outlet 113 are respectively located at two opposite sides of the fluid channel 111 and are in fluid communication with the fluid channel 111. The catchment hole 114 is located below the fluid channel 111 and in fluid communication with the fluid channel 111. With such arrangement, when there is liquid existing in the fluid channel 111, the liquid in the fluid channel 111 will pass through the catchment hole 114 located below the fluid channel 111.

The heat exchanger 120, for example, has a plurality of fins, and the heat exchanger 120 is partially located in the fluid channel 111. The thermoelectric cooler 130 has a cold surface 131 and a hot surface 132 when being electrified. The cold surface 131 of the thermoelectric cooler 130 is thermally coupled to the heat exchanger 120 so as to cool the heat exchanger 120. When the temperature of the heat exchanger 120 is lower than a condensation point of the environment airflow, the heat exchanger 120 condenses moisture in the environment airflow to liquid.

The container 200 has a storage space 210. The storage space 210 is in fluid communication with the fluid channel 111 via the catchment hole 114. The storage space 210 is configured to store the condensed liquid passing through the catchment hole 114.

In this embodiment, the water replenishment device 10 may further include a heat dissipation device 300. The heat dissipation device 300 is thermally coupled to the hot surface 132 of the thermoelectric cooler 130 so as to dissipate heat generated from the thermoelectric cooler 130. Specifically, the heat dissipation device 300 includes a first thermally conductive component 310, a plurality of heat dissipation fins 320, a second thermally conductive component 330, and a plurality of heat pipes 340. The first thermally conductive component 310 is thermally coupled to the hot surface 132 of the thermoelectric cooler 130. The heat dissipation fins 320 are connected to the first thermally conductive component 310. The second thermally conductive component 330 is connected to one side of each of the heat dissipation fins 320 located opposite to the first thermally conductive component 310. Two opposite ends 341 and 342 of each of the heat pipes 340 are respectively connected to the first thermally conductive component 310 and the second thermally conductive component 330 so as to rapidly conduct heat absorbed by the first thermally conductive component 310 to the second thermally conductive component 330. With such arrangement, heat generated from the thermoelectric cooler 130 can be rapidly conducted to two opposite sides of each heat dissipation fin 320, such that the heat dissipation fins 320 can uniformly dissipate heat so as to further enhance the heat dissipation efficiency of the heat dissipation device 300.

In this embodiment, there are the first thermally conductive component 310 and the second thermally conductive component 330 respectively disposed on the two opposite sides of each heat dissipation fin 320, but the present disclosure is not limited thereto; in some other embodiments, the second thermally conductive component 330 may be omitted, and only the side of each heat dissipation fin located closer to the thermoelectric cooler may be provided with a thermally conductive component. In addition, the quantity of the heat pipes 340 is not restricted in the disclosure; in some other embodiments, the heat dissipation device may include only one heat pipe, or the heat dissipation device may not include heat pipe.

In this embodiment, the water replenishment device 10 may further include an air guide 400 and an airflow generator 500. One end 410 of the air guide 400 is in fluid communication with an air outlet 113 of the fluid channel 111, and another end 420 of the air guide 400 is in fluid communication with the air inlet 301 of the heat dissipation device 300. The airflow generator 500 is, for example, an axial fan. The airflow generator 500 is disposed at the air outlet 302 of the heat dissipation device 300, such that the environment airflow can flow into the fluid channel 111 from the air inlet 112, be guided to the heat dissipation device 300 by the air guide 400, and then flow out of the heat dissipation device 300 from the air outlet 302.

Note that the position of the airflow generator 500 is not restricted in the disclosure; in some other embodiments, the airflow generator may be disposed at the air inlet of the fluid channel.

In this embodiment, the seat body 110 of the water generator 100 and the container 200 are two separate pieces assembled with each other, but the disclosure is not limited thereto; in some other embodiments, the seat body of the water generator and the container may be integrally connected to each other so as to form one single piece.

As shown in FIG. 2, when the thermoelectric cooler 130 of the water replenishment device 10 is electrified and the airflow generator 500 is in operation, the thermoelectric cooler 130 decreases the temperature of the heat exchanger 120 to be lower than the condensation point of the environment airflow, and the airflow generator 500 drives the environment airflow to pass through the heat exchanger 120 in the fluid channel 111 along a direction F1, such that at least part of the moisture in the fluid channel 111 is condensed to liquid, and the condensed liquid passes through the catchment hole 114 below the fluid channel 111 and is stored in the storage space 210 of the container 200. Furthermore, the environment airflow cooled in the fluid channel 111 is guided by the air guide 400 so as to flow towards the heat dissipation device 300 along a direction F2, and then flow to the air outlet 302 from the air inlet 301 of the heat dissipation device 300 along a direction F3. Therefore, the environment airflow cooled in the fluid channel 111 can dissipate heat generated from the thermoelectric cooler 130.

Figure 4:
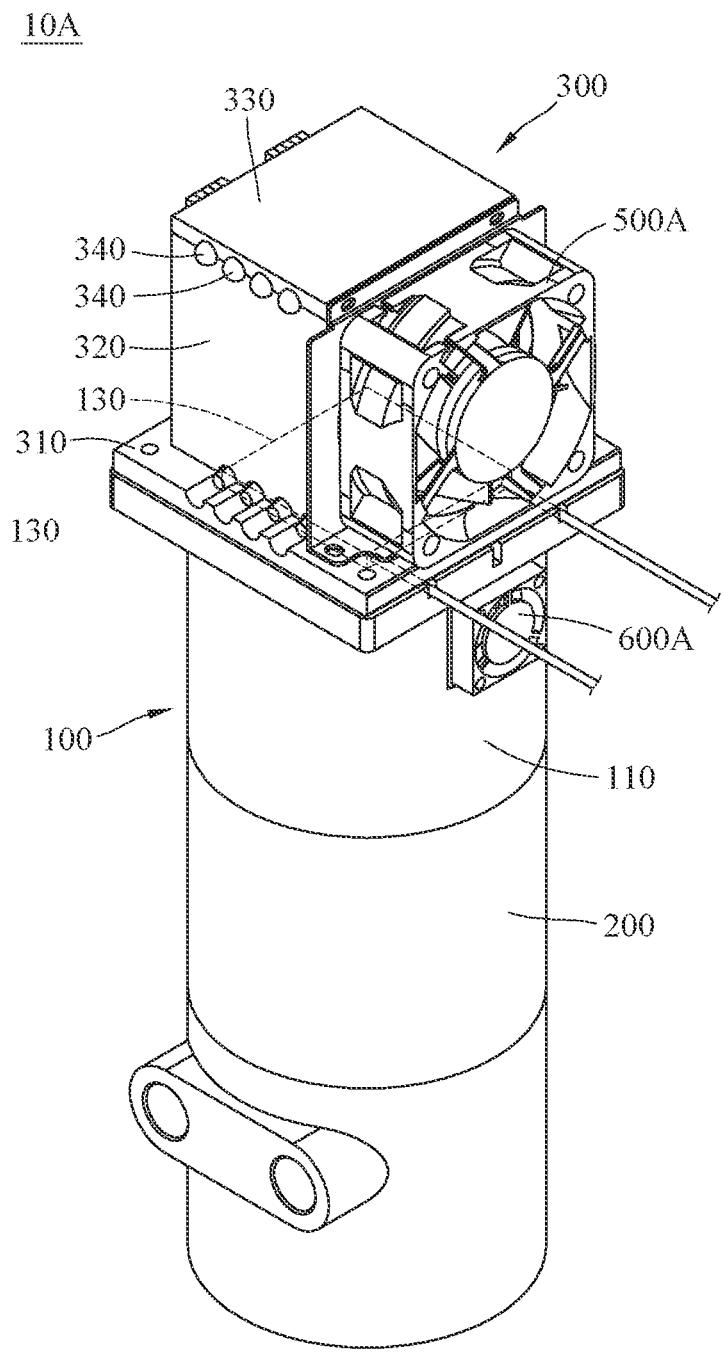
FIG. 4 is a perspective view of a water replenishment device according to a second embodiment of the disclosure.
Figure 5:
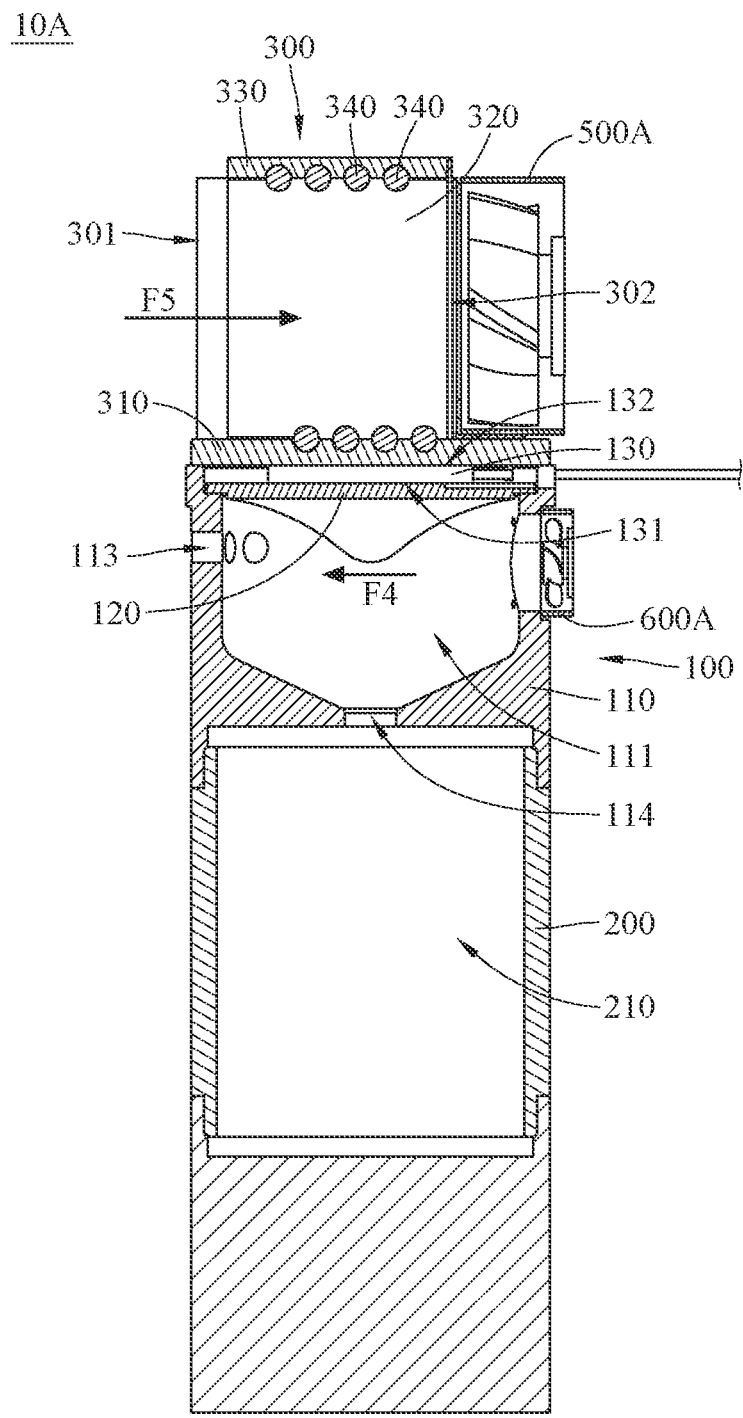
FIG. 5 is a cross-sectional view of the water replenishment device in FIG. 4.

Refer to FIGS. 4 to 5, FIG. 4 is a perspective view of a water replenishment device 10A according to a second embodiment of the disclosure, and FIG. 5 is a cross-sectional view of the water replenishment device 10A in FIG. 4.

In this embodiment, the water replenishment device 10A is, for example, configured to replenish water or coolant into a pump (not shown) for ensuring sufficient amount of the water or coolant in a circulation loop comprising the pump. The water replenishment device 10A includes a water generator 100 and a container 200. The water generator 100 includes a seat body 110, a heat exchanger 120, and a thermoelectric cooler 130. The seat body 110 has a fluid channel 111, an air inlet 112, an air outlet 113, and a catchment hole 114. The fluid channel 111 is configured for an environment airflow to pass therethrough. The air inlet 112 and the air outlet 113 are respectively located at two opposite sides of the fluid channel 111 and are in fluid communication with the fluid channel 111. The catchment hole 114 is located below the fluid channel 111 and in fluid communication with the fluid channel 111. With such arrangement, when there is liquid existing in the fluid channel 111, the liquid in the fluid channel 111 will pass through the catchment hole 114 located below the fluid channel 111.

The heat exchanger 120, for example, has a plurality of fins, and the heat exchanger 120 is partially located in the fluid channel 111. The thermoelectric cooler 130 has a cold surface 131 and a hot surface 132 when being electrified. The cold surface 131 of the thermoelectric cooler 130 is thermally coupled to the heat exchanger 120 so as to cool the heat exchanger 120. When the temperature of the heat exchanger 120 is lower than a condensation point of the environment airflow, the heat exchanger 120 condenses the moisture in the environment airflow to liquid.

The container 200 has a storage space 210. The storage space 210 is in fluid communication with the fluid channel 111 via the catchment hole 114. The storage space 210 is configured to store the condensed liquid passing through the catchment hole 114.

In this embodiment, the water replenishment device 10A may further include a heat dissipation device 300. The heat dissipation device 300 is thermally coupled to the hot surface 132 of the thermoelectric cooler 130 so as to dissipate heat generated from the thermoelectric cooler 130. Specifically, the heat dissipation device 300 includes a first thermally conductive component 310, a plurality of heat dissipation fins 320, a second thermally conductive component 330, and a plurality of heat pipes 340. The first thermally conductive component 310 is thermally coupled to the hot surface 132 of the thermoelectric cooler 130. The heat dissipation fins 320 are connected to the first thermally conductive component 310. The second thermally conductive component 330 is connected to one side of each of the heat dissipation fins 320 located opposite to the first thermally conductive component 310. Two opposite ends 341 and 342 of each of the heat pipes 340 are respectively connected to the first thermally conductive component 310 and the second thermally conductive component 330 so as to rapidly conduct heat absorbed by the first thermally conductive component 310 to the second thermally conductive component 330. With such arrangement, heat generated from the thermoelectric cooler 130 can be rapidly conducted to two opposite sides of each heat dissipation fin 320, such that the heat dissipation fins 320 can uniformly dissipate heat so as to further enhance the heat dissipation efficiency of the heat dissipation device 300.

In this embodiment, there are the first thermally conductive component 310 and the second thermally conductive component 330 respectively disposed on the two opposite sides of each heat dissipation fin 320, but the present disclosure is not limited thereto; in some other embodiments, the second thermally conductive component 330 may be omitted, and only the side of each heat dissipation fin located closer to the thermoelectric cooler may be provided with a thermally conductive component. In addition, the quantity of the heat pipes 340 is not restricted in the disclosure; in some other embodiments, the heat dissipation device may include only one heat pipe, or the heat dissipation device may not include heat pipe.

In this embodiment, the water replenishment device 10A may further include a first airflow generator 500A and a second airflow generator 600A. The first airflow generator 500A is disposed at an air outlet 302 of the heat dissipation device 300. The second airflow generator 600A is disposed at an air inlet 112 of the fluid channel 111.

Note that the position of the first airflow generator 500A is not restricted in the disclosure; in some other embodiments, the first airflow generator may be disposed at an air inlet of the heat dissipation device. In addition, the position of the second airflow generator 600A is also not restricted in the disclosure; in some other embodiments, the second airflow generator may be disposed at an air outlet of the fluid channel.

In this embodiment, the seat body 110 of the water generator 100 and the container 200 are two separate pieces assembled with each other, but the disclosure is not limited thereto; in some other embodiments, the seat body of the water generator and the container may be integrally connected to each other so as to form one single piece.

As shown in FIG. 5, when the thermoelectric cooler 130 of the water replenishment device 10A is electrified and the first airflow generator 500A and the second airflow generator 600A are in operation, the thermoelectric cooler 130 decreases the temperature of the heat exchanger 120 to be lower than the condensation point of the environment airflow, and the second airflow generator 600A drives the environment airflow to pass through the heat exchanger 120 in the fluid channel 111 along a direction F4, such that at least part of the moisture in the fluid channel 111 is condensed to liquid, and the condensed liquid passes through the catchment hole 114 below the fluid channel 111 and is stored in the storage space 210 of the container 200. Then, the environment airflow cooled in the fluid channel 111 flows out of the fluid channel 111 from the air outlet 113. Furthermore, the second airflow generator 600A drives the environment airflow from an air inlet 301 towards the air outlet 302 of the heat dissipation device 300 so as to dissipate heat generated from the thermoelectric cooler 130.

According to the water replenishment devices as discussed in the above embodiments, the thermoelectric cooler and the heat exchanger are provided in the water replenishment device, such that the water replenishment device can condense moisture in the environment airflow to liquid. Therefore, the water replenishment device can timely and constantly perform the replenishment of the water.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A water replenishment device, comprising:
a water generator, comprising:
a seat body, having a fluid channel and a catchment hole, wherein the catchment hole is in fluid communication with the fluid channel, and the fluid channel is configured for an environment airflow to pass therethrough;
a heat exchanger, partially located in the fluid channel; and
a thermoelectric cooler, having a cold surface and a hot surface, wherein the cold surface of the thermoelectric cooler is thermally coupled to the heat exchanger; and
a container, having a storage space, wherein the storage space is in fluid communication with the fluid channel via the catchment hole;
wherein the thermoelectric cooler is configured to condense the environment airflow to a liquid, and the liquid is configured to be stored in the storage space via the catchment hole;
wherein the heat exchanger is located between the cold surface of the thermoelectric cooler and the catchment hole;
wherein the water replenishment device further comprises a heat dissipation device, the heat dissipation device comprises a first thermally conductive component, a second thermally conductive component and a plurality of heat dissipation fins, the second thermally conductive component and the first thermally conductive component are respectively connected to two opposite sides of each of the plurality of heat dissipation fins, and the first thermally conductive component is thermally coupled to the hot surface of the thermoelectric cooler.

2. The water replenishment device according to claim 1, wherein the heat dissipation device further comprises a plurality of heat pipes, two opposite ends of each of the plurality of heat pipes are respectively connected to the first thermally conductive component and the second thermally conductive component.

3. The water replenishment device according to claim 1, further comprising a first airflow generator and a second airflow generator, wherein the first airflow generator is disposed on an air inlet or an air outlet of the heat dissipation device, and the second airflow generator is disposed on an air inlet or an air outlet of the fluid channel.

4. A water replenishment device, comprising:
   a water generator, comprising:
      a seat body, having a fluid channel and a catchment hole, wherein the catchment hole is in fluid communication with the fluid channel, and the fluid channel is configured for an environment airflow to pass therethrough;
      a heat exchanger, partially located in the fluid channel; and
      a thermoelectric cooler, having a cold surface and a hot surface, wherein the cold surface of the thermoelectric cooler is thermally coupled to the heat exchanger; and
   a container, having a storage space, wherein the storage space is in fluid communication with the fluid channel via the catchment hole;
   wherein the thermoelectric cooler is configured to condense the environment airflow to a liquid, and the liquid is configured to be stored in the storage space via the catchment hole;
   wherein the heat exchanger is located between the cold surface of the thermoelectric cooler and the catchment hole;
   wherein the water replenishment device further comprises a heat dissipation device, wherein the heat dissipation device is thermally coupled to the hot surface of the thermoelectric cooler;
   wherein the water replenishment device further comprises an air guide and an airflow generator, wherein one end of the air guide is in fluid communication with an air outlet of the fluid channel, another end of the air guide is in fluid communication with an air inlet of the heat dissipation device, and the airflow generator is disposed on an air outlet of the heat dissipation device or an air inlet of the fluid channel.

\* \* \* \* \*